March 31, 1953     H. J. BROWN     2,633,560

CONVERTER SYSTEM

Filed Oct. 23, 1951

INVENTOR.
HAROLD J. BROWN
BY
Shoedling and Kroot
attys.

Patented Mar. 31, 1953

2,633,560

UNITED STATES PATENT OFFICE 2,633,560

CONVERTER SYSTEM

Harold J. Brown, Indianapolis, Ind.

Application October 23, 1951, Serial No. 252,759

13 Claims. (Cl. 321—2)

My invention relates, in general, to vibrator conversion systems, and, in particular, to circuit arrangements to prevent the usual contact point damage which is associated with the making and breaking of electrical circuits.

In the design of vibrator converters, lowering of the circuit inductances, to facilitate the breaking of the circuit will, due to the nature of contact closure, result in increased damage due to the high currents necessarily flowing to recharge the capacitor.

An object of my invention is, therefore, to provide a circuit which will eliminate the damage to the vibrator contacts so that the vibrator will have superior life and reliability at any given power level.

Another object is to provide increased power handling capacity for any given vibrator, thus obviating the necessity for larger vibrators or for a plurality of contact points.

Another object is to provide a superior consistency of life and performance, since present vibrator conversion systems are notoriously uncertain in their life expectancy.

Another object of my invention is to provide a circuit wherein the burden on the vibrator contacts is so reduced that smaller and higher frequency units may be used for the same life and load.

Another object of my invention is to provide a circuit means such that the voltage across the power transformer is greater than that generated by the source and vibrator, thereby establishing stability automatically.

Another object is to provide a means whereby the inductive burden due to leakage inductance in the transformer is reduced without adding destructive capacitance effects.

Other objects and a fuller understanding of the invention may be had by referring to the following description and claims, taken in conjunction with the accompanying drawings, in which:

Figure 1:
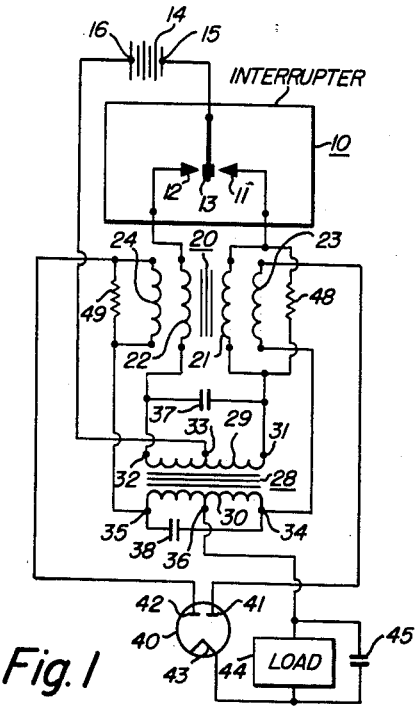
Figure 1 is a diagrammatic illustration of a converted circuit embodying the features of my invention.

With reference to Figure 1, the invention comprises, generally, an interrupter 10, a filtration transformer 20, a power transformer 28 adapted to supply power to a rectifier 40.

The interrupter may be of any suitable design and comprises, generally, two opposed contacts 11 and 12 and a vibrating contact 13 disposed therebetween, which is connected to a terminal 15 of a direct current source 14. The filtration transformer 20 has two primary windings 21 and 22 and two secondary windings 23 and 24. The power transformer 28 has a primary winding 29 and a secondary winding 30. The primary winding 29 has two end terminals 31 and 32 and an intermediate terminal 33. The secondary winding 30 of the power transformer has two end terminals 34 and 35 and an intermediate terminal 36. A capacitor 37 is connected across the two end terminals 31 and 32 of the primary winding of the power transformer and a capacitor 38 is connected across the end terminals 34 and 35 of the secondary winding of the power transformer. The primary winding 21 of the filtration transformer is connected between the contact 11 of the interrupter and the end terminal 31 of the primary winding of the power transformer. Similarly, the primary winding 22 of the filtration transformer is connected between the contact 12 of the interrupter and the end terminal 32 of the primary winding of the power transformer. The secondary winding 23 of the filtration transformer is connected between the end terminal 34 of the secondary winding of the power transformer and input terminal 41 of the rectifier 40. The secondary winding 24 of the filtration transformer is connected between the end terminal 35 of the secondary winding of the power transformer and an input terminal 42 of the rectifier 40. The load 44 is connected between an output terminal 43 of the rectifier and the intermediate terminal 36 of the secondary winding of the power transformer. A capacitor 45 may be connected across the load 44. The intermediate terminal 33 of the primary winding of the power transformer is connected to the terminal 16 of the direct current source 14. A resistor 48 is connected across the primary winding 21 of the filtration transformer and a resistor 49 is connected across the secondary winding 24 of the filtration transformer.

The primary and secondary winding of the filtration transformer have turns ratio substantially equal to the turns ratio of the primary and secondary winding of the power transformer to eliminate the effect of the load current on the primary excitation current. The filtration transformer and the power transformer are preferably linear.

Figure 2:
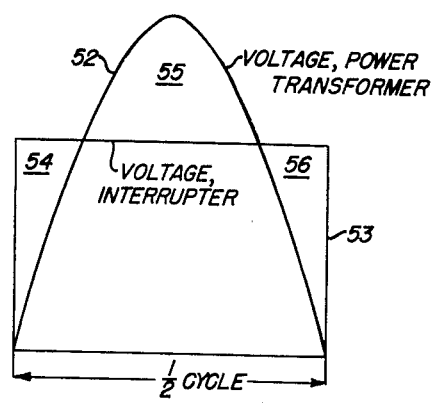
Figure 2 shows the voltage generated by the power transformer and the voltage supplied by the voltage interrupter for a half cycle.

With correct values of the filtration and power transformers and capacitors 37 and 38, the voltage generated by the power transformer may be illustrated by the curve 52 of Figure 2 for one-half cycle and the voltage generated by the interrupter may be represented by the curve 53 of Figure 2.

Figure 3:
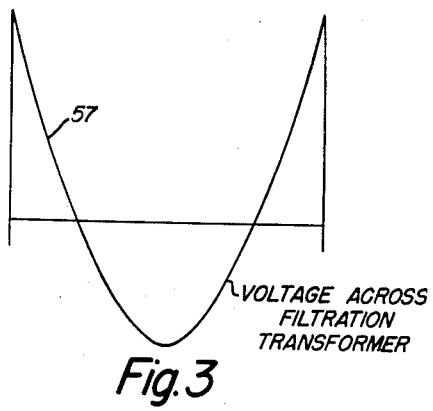
Figure 3 represents the voltage across the filtration transformer for one half cycle.
Figure 4:
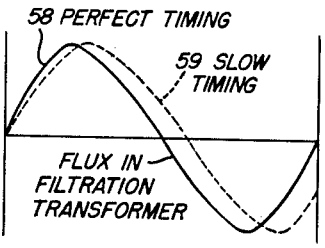
Figure 4 represents the flux in the filtration transformer, the solid line representing the condition for perfect timing and the dotted line representing the condition for slow timing.

The sum of the areas 54 and 56 is preferably made to be substantially the same as the area 55. Under these conditions, the voltage across the filtration transformer may be represented by the curve 57 in Figure 3 for one-half cycle of operation. The flux response to this voltage is shown in Figure 4, where curve 58 shows the response of filtration transformer 20 for perfect timing while curve 59 shows the response for slightly slow timing, which is the preferred operating condition.

Therefore, under preferred operation, the exciting current in the filtration transformer is preferably maintained at a low negative value at the instant of interruption of the interrupting means. In order to give a wide latitude of tolerance in the assembly and adjusting of the circuit, I find that, by preferably operating the timing of the filtration transformer at slightly slow value, the amount of current at the instant of interruption of the contacts is not significant as to its absolute amount since, when the system is connected to a load, the residual energy will tend to flow into the load and, thus, de-energize the filtration transformer 20 or, in the circumstance of the system being without a rectifying means, this energy will be absorbed in resistors 48 and 49 in such a fashion as to automatically render the primary circuit in the stable state. In other words, should the current tend to flow through the contacts, the current would be automatically stopped at the instant the dotted line for slow timing in Figure 4 crosses the X-axis. That is to say, to minimize all of the normal complications to adjusting these converter circuits, I keep the timing slow so that all of the tolerances appear on one side of the X-axis and of a negative value, whereby one hundred per cent assurance is afforded to the complete stoppage of the current at the instant of interruption of the contact. Thus, the normally incorporated primary buffer condenser may be omitted in my converter circuit and, upon contact reclosure, the filtration transformer will be de-energized, which is the ideal condition for the contacts.

Since the buffer condenser has been omitted in my circuit, its destructive effects upon the contacts will be absent. The elimination of the buffer condenser in my circuit makes it possible for me to provide a converter of a high order of consistency.

Since the load current leakage inductive effect is normally confined to the relatively small filtration transformer, I find that my system will provide decreased contact point damage or will allow the contacts to handle a considerably increased amount of current. In a practical embodiment of my system, the general power handling capacity of the device is increased by a factor of at least three. If it is desired to operate the system at a normal power level, cheaper and less expensive contacts may be substituted for expensive or heavy contacts.

My invention makes possible the provision of higher frequency vibrators with acceptable light and power handling capacity, which has been hitherto impractical by virtue of contact damage due to conventional circuitry.

Figure 5:
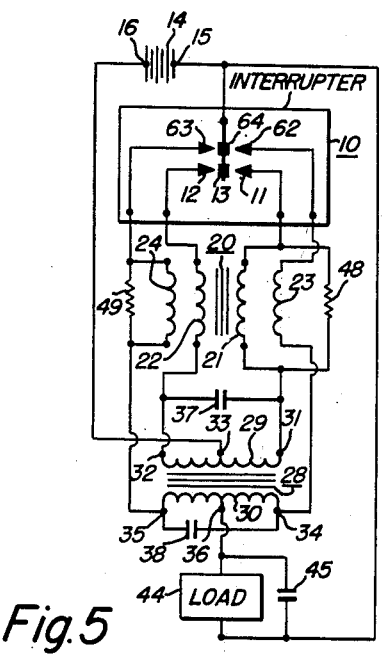
Figure 5 shows a converter circuit of a modified form, as shown in Figure 1.

In Figure 5, I show a modification of the invention in that I employ a set of synchronous contacts 62 and 63 between which is disposed a vibrating contact 64 as a synchronous rectifier which takes the place of the rectifier 40 in Figure 1. Otherwise, the circuit in Figure 4 operates the same as that described in reference to Figure 1. The rectifier 40 in Figure 1 may be of any suitable type such, for example, as a rectifying tube, a dry type of rectifier, or a gaseous type rectifier. Capacitors 37 and 38 do not function as buffer capacitors, since they are isolated from the contacts of the vibrating interrupter by the inductance of the filtration transformer 20.

Although the invention has been described in its preferred form, with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A converter circuit energized from a direct current source and disposed between interrupting means and output rectifying means, said converter circuit comprising a filtration transformer having primary and secondary windings, a power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, and capacity means in circuit relation with said power transformer for exciting the power transformer with current for generating in said power transformer a voltage opposing the voltage supplied by the interrupting means to minimize the exciting current flow through the filtration transformer to a low or negative value at the instant of interruption of the interrupting means.

2. A converter circuit energized from a direct current source and disposed between interrupting means and output rectifying means supplying a load current, said converter circuit comprising a filtration transformer having primary and secondary windings, a power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, and capacity means in circuit relation with said power transformer for exciting the power transformer with current for generating in said power transformer a voltage opposing the voltage supplied by the interrupting means to minimize the exciting current flow through the filtration transformer to a low or negative value at the instant of interruption of the interrupting means, said filtration transformer having a primary and secondary turns ratio substantially equal to the primary and secondary turns ratio of the power transformer to eliminate the effect of the load current on the primary excitation current.

3. A converter circuit energized from a direct current source and disposed between interrupting means and output rectifying means supplying a load current, said converter circuit comprising a linear filtration transformer having primary and secondary windings, a linear power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, and capacity means in circuit relation with said power transformer for exciting the power transformer with current for generating in said power transformer a voltage opposing the voltage supplied by the interrupting means to minimize the exciting current flow through the filtration transformer to a low or negative value at the instant of interruption of the interrupting means, said filtration transformer having a primary and secondary turns ratio substantially equal to the primary and secondary turns ratio of the power transformer to eliminate the effect of the load current on the primary excitation current.

4. A converter circuit energized from a direct current source and disposed between interrupting means and output rectifying means, said converter circuit comprising a filtration transformer having primary and secondary windings, a power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, and capacity means in circuit relation with said power transformer for exciting the power transformer with current for generating in said power transformer a voltage opposing the voltage supplied by the interrupting means to minimize the exciting current flow through the filtration transformer to a low or negative value at the instant of interruption of the interrupting means, said interrupting means and said rectifying means having respectively vibrating contacts synchronously operated.

5. A converter circuit energized from a direct current source and disposed between interrupting means and output rectifying means supplying a load current, said converter circuit comprising a linear filtration transformer having primary and secondary windings, a linear power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, and capacity means in circuit relation with said power transformer for exciting the power transformer with current for generating in said power transformer a voltage opposing the voltage supplied by the interrupting means to minimize the exciting current flow through the filtration transformer to a low or negative value at the instant of interruption of the interrupting means, said filtration transformer having a primary and secondary turns ratio substantially equal to the primary and secondary turns ratio of the power transformer to eliminate the effect of the load current on the primary excitation current, said interrupting means and said rectifying means having respectively vibrating contacts synchronously operated.

6. A converter circuit energized from a direct current source and disposed between interrupting means and output rectifying means, said converter circuit comprising a filtration transformer having primary and secondary windings, a power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, and capacity means in circuit relation with said power transformer for exciting the power transformer with current for generating in said power transformer a voltage opposing the voltage supplied by the interrupting means to minimize the exciting current flow through the filtration transformer to a low or negative value at the instant of interruption of the interrupting means, and energy absorbing impedance means connected in circuit relation with said filtration transformer.

7. A converter circuit energized from a direct current source and disposed between interrupting means and output rectifying means, said converter circuit comprising a filtration transformer having primary and secondary windings, a power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, and capacity means in circuit relation with said power transformer for exciting the power transformer with current for generating in said power transformer a voltage opposing the voltage supplied by the interrupting means to minimize the exciting current flow through the filtration transformer to a low or negative value at the instant of interruption of the interrupting means, said interrupting means comprising vibrating contact and said rectifying means comprising relatively fixed elements between which current flows.

8. A converter circuit energized from a direct current source and disposed between interrupting means and output rectifying means, said converter circuit comprising a filtration transformer having primary and secondary windings, a power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, and capacity means in circuit relation with said power transformer for exciting the power transformer with current for generating in said power transformer a voltage opposing the voltage supplied by the interrupting means to minimize the exciting current flow through the filtration transformer to a low or negative value at the instant of interruption of the interrupting means, said interrupting means and said rectifying means respectively vibrating contacts synchronously operated, and energy absorbing impedance means connected in circuit relation with said filtration transformer.

9. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said converter circuit comprising a first transformer having a first and second primary winding and having a first and second secondary winding, a second transformer having a primary winding and a secondary winding, said primary winding of the second transformer having first and second end terminals and an intermediate terminal therebetween, said secondary winding of the second transformer having first and second end terminals and an intermediate terminal therebetween, first circuit means connecting the first primary winding of the first transformer between the first contact of the interrupter means and the first end terminal of the primary winding of the second transformer, second circuit means for connecting the second primary winding of the first transformer between the second contact of the interrupter means and the second end terminal of the primary winding of the second transformer, first connection means for connecting the first secondary winding of the first transformer between the first end terminal of the secondary winding of the second transformer and the first input terminal of the rectifying means, second connection means for connecting the second secondary winding of the first transformer between second end terminal of the secondary winding of the second transformer to the second input terminal of the rectifying means, third connection means for connecting the intermediate terminal of the primary winding of the second transformer to the other side of the direct current source, a load circuit connected between the intermediate terminal of the secondary winding of the second transformer to the output terminal means of the rectifying means, capacitor means connected between the end terminals of the primary winding of the second transformer, and capacitor means connected between the end terminals of the secondary winding of the second transformer.

10. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said first and second input terminals comprising opposed contacts and said output terminal means comprising a vibrating contact disposed between said opposed contacts, said vibrating contact of the rectifying means and said vibrating contact of the interrupter means being synchronously operated, said converter circuit comprising a first transformer having a first and second primary winding and having a first and second secondary winding, a second transformer having a primary winding and a secondary winding, said primary winding of the second transformer having first and second end terminals and an intermediate terminal therebetween, said secondary winding of the second transformer having first and second end terminals and an intermediate terminal therebetween, first circuit means connecting the first primary winding of the first transformer between the first contact of the interrupter and the first end terminal of the primary winding of the second transformer, second circuit means for connecting the second primary winding of the first transformer between the second contact of the interrupter and the second end terminal of the primary winding, first connection means for connecting the first secondary winding of the first transformer between the first end terminal of the secondary winding of the second transformer and the first input terminal of the rectifying means, second connection means for connecting the second secondary winding of the first transformer between second end terminal of the secondary winding of the second transformer to the second input terminal of the rectifying means, third connection means for connecting the intermediate terminal of the primary winding of the second transformer to the other side of the direct current source, a load circuit connected between the intermediate terminal of the secondary winding of the second transformer to the output terminal means of the rectifying means, capacitor means connected between the end terminals of the primary winding of the second transformer, and capacitor means connected between the end terminals of the secondary winding of the second transformer.

11. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said converter circuit comprising a first transformer having a first and second primary winding and having a first and second secondary winding, a second transformer having a primary winding and a secondary winding, said primary winding of the second transformer having first and second end terminals and an intermediate terminal therebetween, said secondary winding of the second transformer having first and second end terminals and an intermediate terminal therebetween, first circuit means connecting the first primary winding of the first transformer between the first contact of the interrupter and the first end terminal of the primary winding of the second transformer, second circuit means for connecting the second primary winding of the first transformer between the second contact of the interrupter and the second end terminal of the primary winding, first connection means for connecting the first secondary winding of the first transformer between the first end terminal of the secondary winding of the second transformer and the first input terminal of the rectifying means, second connection means for connecting the second secondary winding of the first transformer between second end terminal of the secondary winding of the second transformer to the second input terminal of the rectifying means, third connection means for connecting the intermediate terminal of the primary winding of the second transformer to the other side of the direct current source, and a load circuit connected between the intermediate terminal of the secondary winding of the second transformer to the output terminal means of the rectifying means, capacitor means connected between the end terminals of the first winding of the second transformer and capacitor means connected between the end terminals of the second winding of the second transformer, said first transformer having a primary and secondary turns ratio substantially equal to the primary and secondary turns ratio of the second transformer to eliminate the effect of the load current on the primary excitation current.

12. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said first and second input terminals and said output terminal means comprising relatively fixed elements between which current flows, said converter circuit comprising a first transformer having a first and second primary winding and having a first and second secondary winding, a second transformer having a primary winding and a secondary winding, said primary winding of the second transformer having first and second end terminals and an intermediate terminal therebetween, said secondary winding of the second transformer having first and second end terminals and an intermediate terminal therebetween, first circuit means connecting the first primary winding of the first transformer between the first contact of the interrupter and the first end terminal of the primary winding of the second transformer, second circuit means for connecting the second primary winding of the first transformer between the second contact of the interrupter and the second end terminal of the primary winding, first connection means for connecting the first secondary winding of the first transformer between the first end terminal of the secondary winding of the second transformer and the first input terminal of the rectifying means, second connection means for connecting the second secondary winding of the first transformer between second end terminal of the secondary winding of the second transformer to the second input terminal of the rectifying means, third connection means for connecting the intermediate terminal of the primary winding of the second transformer to the other side of the direct current source, a load circuit connected between the intermediate terminal of the secondary winding of the second transformer to the output terminal means of the rectifying means, capacitor means connected between the end terminals of the primary winding of the second transformer, and capacitor means connected between the end terminals of the secondary winding of the second transformer.

13. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said converter circuit comprising a first transformer having a first and second primary winding and having a first and second secondary winding, a second transformer having a primary winding means and a secondary winding means, said primary winding means of the second transformer having first and second end terminals and an intermediate terminal therebetween, said secondary winding means of the second transformer having first and second end terminals and an intermediate terminal therebetween, first circuit means connecting the first primary winding of the first transformer between the first contact of the interrupter means and the first end terminal of the primary winding means of the second transformer, second circuit means for connecting the second primary winding of the first transformer between the second contact of the interrupter means and the second end terminal of the primary winding means of the second transformer, first connection means for connecting the first secondary winding of the first transformer between the first end terminal of the secondary winding means of the second transformer and the first input terminal of the rectifying means, second connection means for connecting the second secondary winding of the first transformer between second end terminal of the secondary winding means of the second transformer to the second input terminal of the rectifying means, third connection means for connecting the intermediate terminal of the primary winding means of the second transformer to the other side of the direct current source, a load circuit connected between the intermediate terminal of the secondary winding means of the second transformer to the output terminal means of the rectifying means, and capacitor means connected in shunt relation with winding means on the second transformer.

HAROLD J. BROWN.

REFERENCES CITED

The following references are of record in the file of this patent:

UNITED STATES PATENTS

| Number | Name | Date |
|---|---|---|
| 857,080 | Leblanc | June 18, 1907 |
| 1,659,110 | Lennox | Feb. 14, 1928 |
| 1,961,080 | Sabbah | May 29, 1934 |
| 2,327,576 | Brown | Aug. 24, 1943 |
| 2,338,079 | Huge | Dec. 28, 1943 |
| 2,338,080 | Brown | Dec. 28, 1943 |
| 2,579,235 | Kerns | Dec. 18, 1951 |